United States Patent [19]

Arai

[11] Patent Number: 4,904,378

[45] Date of Patent: Feb. 27, 1990

[54] FLAT ELEMENT FOR FILTERING AND SEPARATION

[75] Inventor: Koichi Arai, Kanagawa, Japan

[73] Assignee: Arai Machinery Corporation, Japan

[21] Appl. No.: 184,078

[22] Filed: Apr. 20, 1988

[30] Foreign Application Priority Data

Apr. 20, 1987 [JP] Japan .................................. 62-095458

[51] Int. Cl.⁴ .............................................. B07B 1/46
[52] U.S. Cl. .................................... 209/400; 209/392; 209/395; 210/483
[58] Field of Search ............... 209/400, 395, 393, 392, 209/362; 210/497.1, 483; 29/163.6, 163.7, 163.8

[56] References Cited

U.S. PATENT DOCUMENTS

| | | | |
|---|---|---|---|
| 1,224,598 | 5/1917 | Burch | 209/395 |
| 1,269,579 | 6/1918 | Canada | 209/395 |
| 2,482,330 | 9/1949 | Dudzinski | 209/362 |
| 2,537,889 | 1/1951 | Bricker | 209/362 |
| 4,569,763 | 2/1986 | Arai | 210/497.1 |

FOREIGN PATENT DOCUMENTS 450534 7/1936 United Kingdom ................ 209/400

Primary Examiner—Donald T. Hajec
Attorney, Agent, or Firm—Gofford, Groh, Sheridan, Sprinkle and Dolgorukov

[57] ABSTRACT

A flat element for filtering various substances and separating particles wherein a wire is planarly wound in the form of a vortex to form a vortical slit between the adjoining peripheral margins of the wire thereby increasing the area for filtering or separation treatment as so-called linear treatment holes to the utmost to improve the filtering or separation efficiency.

5 Claims, 2 Drawing Sheets

FLAT ELEMENT FOR FILTERING AND SEPARATION

BACKGROUND OF THE INVENTION

1. Field of the Invention

The present invention relates to a flat element for filtering various substances and separating particles.

2. Description of the Prior Art

Conventional, well-known flat elements of this type generally assume a structure provided with net-like or lattice-like filtering holes.

A porous, plate element using ceramics has recently been developed. The net-like structure is provided with point filtering holes, however, resulting in small filtering areas which lead to significant clogging. There is a problem in that the smaller the particle size to be filtered, the more significant clogging results. Furthermore, the lattice-like structure compels the porous structure to perform three-dimensional filtering even when it is formed as a flat structure, such that impermeable foreign matter creates a clog in the porous structure which increases in size and results in unavoidable reduced filtering capacity. Therefore, requiring the foreign matter in the porous structure to be frequently removed by means of cleansing.

SUMMARY OF THE INVENTION

The present invention is designed in view of the above problems. It is an object of the present invention to provide a flat element for filtering various substances and separating particles wherein a wire is planarly wound in the form of a helix to form a helical slit between the adjoining peripheral margins of the wire thereby increasing the area for filtering or separation treatment by creating a maximum amount of linear treatment holes to improve the filtering or separation efficiency.

Because of the planar shaped construction, a fluid to be treated such as a liquid or gas is subjected to over-all, uniform, filtering and separation treatment without deviation of the fluid with regard to its flow. Because the holes for filtering or separation treatment are helical slit holes, linear treatment holes are formed to improve the flow of filtering.

The treating operation can be conducted smoothly because any residue such as filtered waste can be removed by a single operation such as back-wash or scraping.

DETAILED DESCRIPTION OF PREFERRED EMBODIMENT

Figure 1:
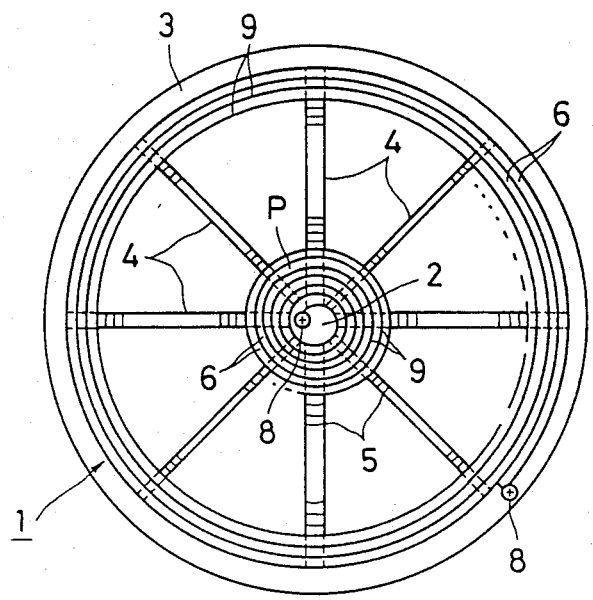
FIG. 1 is a plan view showing one embodiment of the flat element for filtering and separation in the present invention.

One embodiment of the present invention is described below with reference to the drawings.

A flat frame plate 1 with a flat face is composed of a central member 2, an annular member 3 provided on the outer periphery of the flat frame 1, and a plural number of radially extending support frame 4 provided between the both members 2 and 3. Locking grooves 5 are cut precisely and at a definite pitch from the centerr of the flat frame plate 1 toward the outer periphery thereof. A wire 6 is helically wound along the locking grooves 5 while being engaged therewith. Both ends of the wire 6 are in engagement with portions of first and second helica concave grooves 7 formed on the annular member 3 and the central member 2 and are secured thereto using a locking device 8 such as a screw for attachment thereto.

The wire has a cross-section of an equilateral triangle and the locking grooves 5 are shaped in the form of V in agreement with the form of the top of the wire 6 so as to be capable of obtaining a helical form. The adjoining surfaces of the wound wire 6 are formed in the same plane for enabling the formation of a flat surface P.

Slit holes 9 with uniform intervals are provided between the adjoining peripheral margins of the wire 6 which is helically wound. The precision of the slit holes 9 is first determined by the processing precision of the wire 6 and the cutting precision of the helical locking grooves 5 into the flat frame plate 1 and finally determined by the winding operation of the wire 6. The spacing between adjacent locking grooves 5 on each of the radially extending support frames 4 determines the distance between each turn of the helically wound wire 6 and establishes the particle size to be filtered through the filter element.

Figure 2:
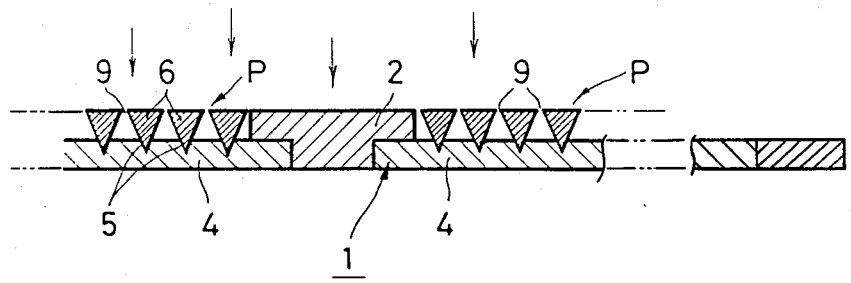
FIG. 2 is an enlarged perspective view of the central portion of the above.
Figure 3:
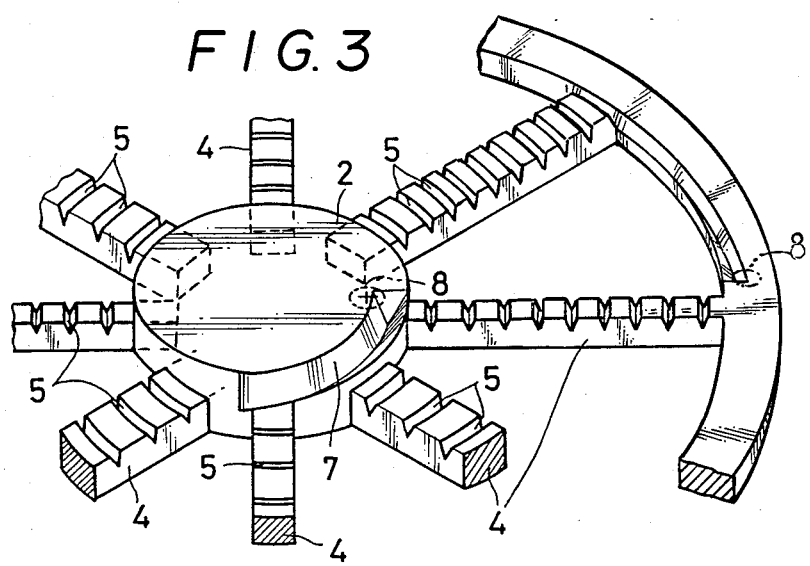
FIG. 3 is an enlarged perspective view in a state which the wire on the central portion is removed.
Figure 4:
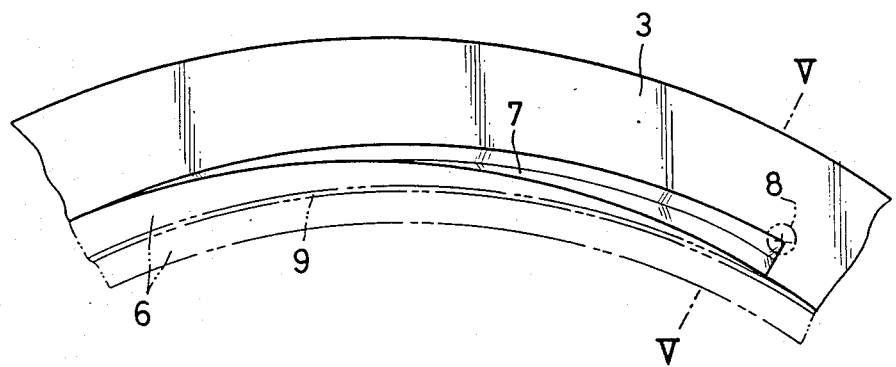
FIG. 4 is an enlarged plan view of the outer periphery of the element.
Figure 5:
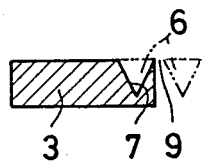
FIG. 5 is a cross-sectional view along the lines V—V in FIG. 4.

A wire 6, having a cross-section of an equilateral triangle as illustrated in FIG. 2, allows the precision of the widths of the slit holes 9 to be within one micron.

The elements of the wire 6 and the flat frame plate 1 may be made of metals or other preferred materials such as plastics or ceramics.

The following description is based on the above structure.

The flat surface P of the helical wire 6 is directed to the primary side as illustrated in FIG. 2 and fixed to a pipe using the annular member 3 on the outer periphery and a desired fluid to be treated (a liquid or a gas) is allowed to pass toward the slit holes 9 in the direction of the arrow marks.

The residues larger than the widths of the slit holes 9 enable the filtering and separation thereof, and are removed from the fluid for filtering. Several substances, separating particles and any fluid containing particles smaller than the widths of the slit holes 9 are allowed to pass through the holes.

The residues which are filtered and separated therefrom pile up on the flat surface P on the surface of the wire 6. These residues can easily and accurately be cleaned by the fluid from the reverse direction (the secondary side) by means of back-washing or a scraper (not shown) such that successive filtering and separation can be performed as is desired.

Although one embodiment of the present invention is described, the above flat frame plate 1 may also use a flat plate on which a number of holes are provided to form a lattice net plate, and a drainboard (not shown) instead of the support frames 4 and the locking grooves 5. This lattice plate can be formed of grooves which can be in any formation of the cross-section of the wire 6 which is helically wound such as a circle, an ellipse or a trapezoid.

Means for fixing and securing the flat frame plate 1 to the wire 6 to be wound may be by means of a setscrew, spot fusion, or adhesive at each portion in addition to fixation of both ends by means of the locking member 8, or such means can be used in replaced of locking member 8.

According to the present invention, slit holes can be formed in the flat frame plate by means of a helical wire in a flat state. Placing the wire in this state creates a markedly increasing volume of treatment such as filtering and separation at the linear treatment holes. The slit holes themselves can be helically formed by the adjoining gaps between the wire which is helically wound, such that the widths can be determined precisely for enabling highly precise filtering and separation operations.

Because the element is entirely flat, it can be used with wide exchangeability as a permanent filtering and separation element instead of various disposable filters.

What is claimed is:

1. A porous flat element for filtering and separation including; in combination:
   (a) a central member having at least a portion of a first helical groove of a desired cross section formed therein;
   (b) an annular member coaxial with said central member and having at least a portion of a second helical groove of a desired cross-section formed therein;
   (c) a plurality of radially extending support frames extending between said central member and said annular member;
   (d) locking grooves provides in said support frames;
   (e) a wire of uniform cross section formed into a helix and extending from said first helical groove in said central member to said second helical groove in said annular member and engaging said locking grooves in said radially extending frame members;
   (f) a locking member on said central member to fix said wire into said first helical groove in said central member; and
   (g) a locking member on said annular member to fix said wire in said second helical groove in said annular member.

2. The invention as defined in claim 1, wherein said locking grooves are V-shaped to conform with said wire which, in cross-section, is an equilateral triangle.

3. The invention defined in claim 1, wherein each of said support frames is provided with a plurality of spaced locking grooves, said grooves determining the location of each turn of said helically wound wire and the spacing therebetween, said spacing establishing the particle size to be filtered through said element.

4. The invention as defined in claim 1, wherein said wire has a cross-section of an equilateral triangle.

5. The invention as defined in claim 1, wherein said locking groove are V-shaped.

* * * * *